July 7, 1942.   O. V. HADLEY   2,289,115

VARIABLE RESISTANCE DEVICE

Filed Dec. 4, 1940

INVENTOR
*Oscar V. Hadley*
BY
ATTORNEY

Patented July 7, 1942

2,289,115

UNITED STATES PATENT OFFICE 2,289,115

VARIABLE RESISTANCE DEVICE

Oscar V. Hadley, Plainfield, Ind., assignor to P. R. Mallory & Co., Inc., Indianapolis, Ind., a corporation of Delaware Application December 4, 1940, Serial No. 368,435

3 Claims. (Cl. 201—55)

This invention relates to variable resistance devices such as volume controls adapted for use in radio sets and the like.

An object of the invention is to improve variable resistance devices of the type described.

Other objects of the invention will be apparent from the following description and accompanying drawing taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawing.

Figure 1:
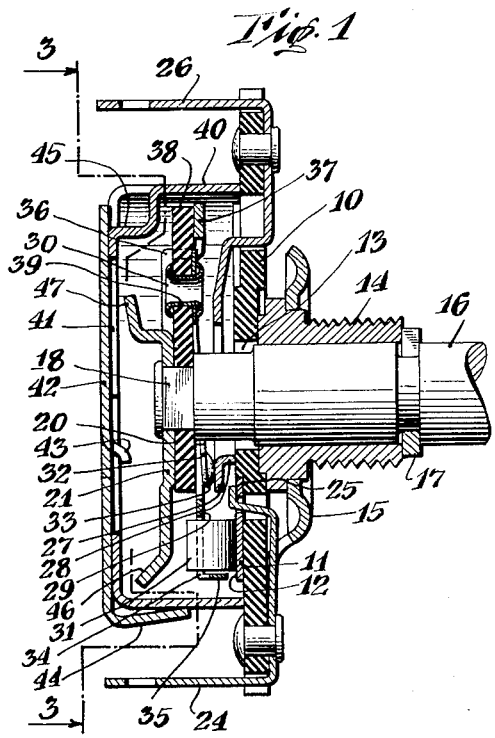
Figure 1 is a section through a variable resistance device embodying features of the present invention, the section being taken on the line 1—1 of Figure 2.
Figure 2:
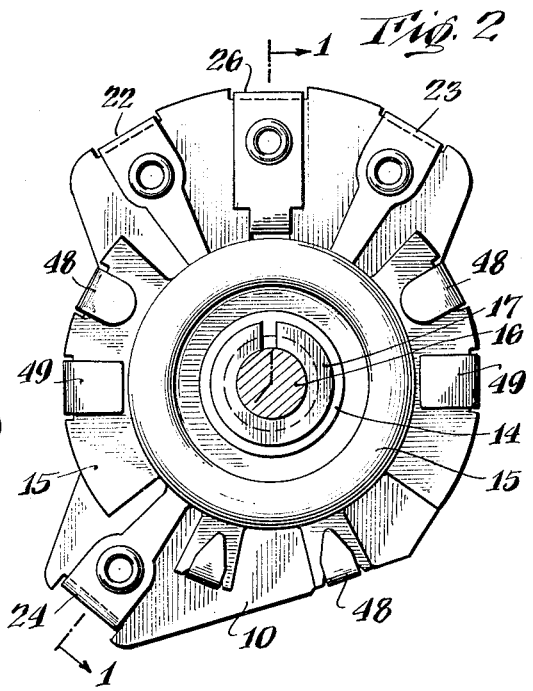
Figure 2 is an end view of the device as seen from the shaft end.
Figure 3:
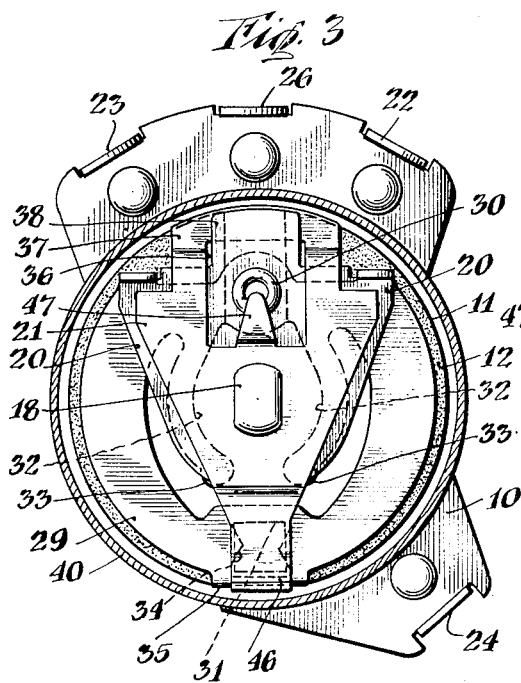
Figure 3 is a section on the line 3—3 of Figure 1.
Figure 4:
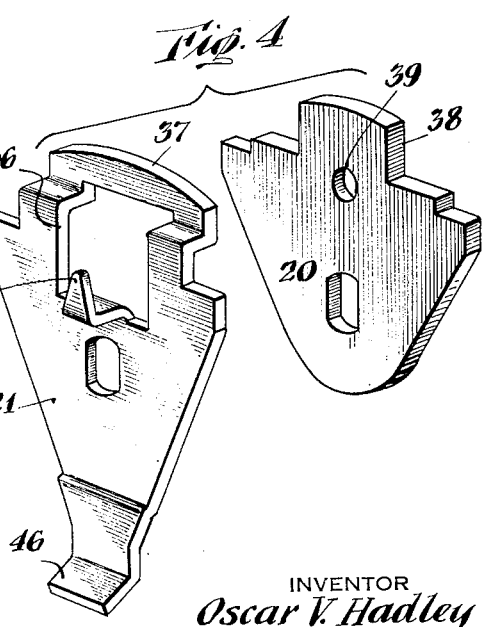
Figure 4 is a perspective view of two cooperating parts of the device.

A feature of the present invention resides in the improvement in the mechanical construction of the variable resistance device described. One of these mechanical improvements comprises the cooperation between a metal stiffener plate and an insulating sheet used for supporting the movable arm of the device. Another feature resides in the construction of the movable arm. A further feature resides in the cover structure. Other features will be obvious from the following disclosure.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring to the drawing, the variable resistance device comprises an insulating base plate 10 of Bakelite or other sheet insulating material upon which is supported a flat ring 11 of insulating material such as paper, Bakelite fibre or other sheet insulating material having a surface 12 thereon of carbon paint or other resistance material. Base plate 10 is provided with a central aperture 13. A metal bushing 14 having a central aperture therein is clamped against the back of base plate 10 by metallic shield plate 15 with its aperture aligned with the central aperture in base plate 10.

A control shaft 16 extends through the aperture in bushing 14 and plate 10 into the inside of the variable resistance unit. A clinch ring 17 fitting within a groove in shaft 16 limits the movement along the axis of shaft 16 into the bushing. The inner end of shaft 16 is provided with a reduced flattened end portion 18 and threaded thereover are, first, an insulating sheet 20 of Bakelite or similar sheet insulating material, then a metal plate member 21 after which the end of reduced portion 18 of the shaft is headed over to permanently secure the parts on the shaft and hold them together in rigid assembly. The apertures in sheet 20 and plate 21 are of similar cross-sectional shape to shaft position 18.

Ring 11 and resistance surface 12 thereon have a short section cut out therefrom so that the resistance surface does not form a complete circle but has two terminal ends. These ends are preferably coated with a highly conductive paint, such as silver paint, for providing good terminal connections. Metal terminal lugs 22 and 23 are riveted to the back of base 10 and have connecting portions which pass through apertures in base 10 and ring 11, the inner ends of said connecting strap portions are so preformed as to lay flat against the conductive paint surface at the ends of the resistance element. A tap terminal 24 is similarly riveted to the back of base plate 10 and has a connecting strap portion passing up through an aperture therein and through an aperture in ring 11 where its inner end is so formed as to lay down against a small arc of silver paint 25 paralleling the resistance element 12 on ring 11. A silver paint bridge is applied at an appropriate point connecting the silver paint arc 25 and the resistance paint surface 12 at the point at which a tap terminal connection is desired. From the shape of the terminal lugs 22, 23, and 24 it will be obvious that the lugs are preformed in the shape illustrated and inserted in the assembly with the inner ends contacting the silver paint surfaces and then riveted in place, thereby applying a spring bias firmly pressing the connecting strap end against the silver paint surface.

An additional terminal 26 is mounted on base 10 midway between terminals 22 and 23 and extends up through the notch provided by cutting out a portion of ring 11 and is formed with a ring portion 27 extending around shaft 16 and spaced therefrom. Ring portion 27 is slightly smaller in diameter than resistance ring 11 and is provided with a plurality of bent down legs 28 for supporting the ring 27 in spaced relation to base 10 and ring 11.

A contact arm 29 is riveted to insulating sheet 20 by rivet or eyelet 30 and carries, at a diametrically opposite position from eyelet 30, a cylindrical contact 31 which slides along resistance surface 12. Contact arm 29 is made of spring metal, such as spring bronze, and is generally circular in shape so that contact 31 is joined to the portion held by rivet 30 by two nearly semi-circular arms going around opposite sides of shaft 16. A pair of additional contact arms 32 integrally formed from the same sheet as arm 29 inside arm 29 extend around the two opposite sides of shaft 16 and have contacting end portions 33 which slide on ring portion 27 of terminal 26. It will thus be seen that the contact arm element makes sliding contact both with the ring portion 27 of terminal 26 and the resistance surface 12. Hence, terminal 26 comprises the contact arm terminal of the device.

Contact arm 29 is spring biased away from supporting insulating sheet 20 and toward resistance surface 12. Contact cylinder 31 is fitted within a generally rectangular aperture 34 in arm 29, the aperture having inwardly extending projections at its two edges to provide a rocking engagement with contact 31. The end of arm 29 beyond contact 31 is bent down at right angles as shown at 35 to properly cage contact 31 at this point and at the same time to decrease its length.

A feature of the present invention resides in the means for stiffening and supporting insulating sheet 20 by the use of metal plate 21. As is known, materials such as Bakelite and other synthetic insulating materials are subject to cold flow when placed under stress. This results in a gradual change in shape of the insulating support over periods of time. Heretofore when contact arms for resistance devices have been mounted on Bakelite arms the spring bias necessary to provide contact pressure has frequently produced sufficient cold flow in the Bakelite supporting arm to result in an eventual change of shape of the arm with consequent reduction of the contact pressure due to relaxing of the spring tension. Contact pressure in devices of the type described must be carefully controlled for proper operation of the device. If the pressure is too great the device is subjected to excessive wear and consequent change in characteristics, while if the pressure is too slight improper contact is made resulting in noisy and unstable operation.

By providing stiffener plate 21 of the shape described cold flow of Bakelite sheet 20 is effectively prevented so that the contact pressure is held constant throughout the life of the device. It will be noted that the spring bias of arm 29 is such as to warp plate 20 toward base 10 at the point where they are riveted together by eyelet 30. To prevent this warping action the metal plate 21 is provided with a generally rectangular aperture 36 and the portion 37 of plate 21 at the outer end of the aperture is offset to a position in a plane parallel to the plane of the main portion of plate 21. Bakelite sheet 20 is provided with a tongue 38 on its edge beyond aperture 39 for receiving eyelet 30. Tongue 38 is then threaded into aperture 36 of stiffener plate 21 before the parts are assembled on the reduced end of shaft 16. By this construction the main body of insulating sheet 20 is covered with and stiffened by stiffener plate 21 while the tongue 38 is stiffened by portion 37 of plate 21 bearing against the opposite surface thereof. It will be seen that this effectively prevents deformation of sheet 20 by the spring bias of arm 29.

A cylindrical metal casing 40 is provided for the operating parts of the resistance device. A pair of additional ears 49 are provided which can be bent up, when desired, to serve as locating lugs for mounting the device in a radio set, the casing being secured to base 10 by ears 48 bent around the edge of base 10 and shield plate 15. The end wall of casing 40 is provided with an opening 41 covered by a covered by a cover plate 42 secured thereon by hooks 43 which hook over shoulders formed in opposite edges of aperture 41 and spring tongue 44 which holds hook portions 43 in place. It will be obvious that cover plate 42 may readily be removed by merely pressing spring tongue 44 thus permitting a snap acting AC switch to be secured to the back of casing.

Casing 40 is provided with a bent-in corner 45 and stiffener plate 21 has a projecting arm 46 which engages corner 45 during its rotation thereby limiting the rotation of the control arm and preventing it from overrunning the ends of resistance surface 12. Stiffener plate 21 is also provided with a small tongue 47 for engaging and operating the actuating lever of an AC switch when said switch is secured to the back of casing 40.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A variable resistance device comprising an arcuate plane resistance surface, a shaft concentric therewith, and a contact arm assembly clamped to said shaft, said assembly comprising a support of sheet insulating material parallel to said resistance surface, a spring contact arm secured to said support at an eccentric point and extending around said shaft and engaging said resistance surface at a point diametrically opposite to said eccentric point, said arm being biased to press against said resistance surface, and thereby tending to bend said support out of its plane, and means to prevent said bending comprising a metal plate clamped against the outer face of said support, said plate having an integral extension clamped against the inner face of said support in the region beyond said eccentric point and joined to the main body of said plate by a pair of arms passing around opposite edges of said support.

2. A variable resistance device comprising an arcuate plane resistance surface, a shaft concentric therewith, and a contact arm assembly clamped to said shaft, said assembly comprising a support of sheet insulating material parallel to said resistance surface, a spring contact arm secured to said support at an eccentric point and extending around said shaft and engaging said resistance surface at a point diametrically opposite to said eccentric point, said arm being biased to press against said resistance surface, and thereby tending to bend said support out of its plane, and means to prevent said bending comprising a metal plate clamped against the outer face of said support, said plate having an integral extension clamped against the inner face of said support in the region beyond said eccentric point and joined to the main body of said plate by a pair of arms passing around opposite edges of said support, said plate having an aperture between said extension and the main body thereof between said arms to provide spacing between said plate and said spring contact.

3. A variable resistance device comprising an arcuate plane resistance surface, a shaft concentric therewith, and a contact arm assembly clamped to said shaft, said assembly comprising a support of sheet insulating material parallel to said resistance surface, a spring contact arm secured to said support at an eccentric point and extending around said shaft and engaging said resistance surface at a point diametrically opposite to said eccentric point, said arm being biased to press against said resistance surface, and thereby tending to bend said support out of its plane, and means to prevent said bending comprising a metal plate clamped against the outer face of said support, said plate having an integral extension clamped against the inner face of said support in the region beyond said eccentric point and joined to the main body of said plate by a pair of arms passing around opposite edges of said support, a case enclosing said resistance surface and contact arm assembly, said case having a stop projection thereon, and said metal plate having a stop arm integral therewith and positioned to encounter said stop projection in its rotary travel.

OSCAR V. HADLEY.